Patented Apr. 7, 1953

2,634,256

UNITED STATES PATENT OFFICE 2,634,256

MODIFIED OLEFIN-DIOLEFIN RESIN

William J. Sparks, Westfield, David W. Young, Roselle, and John D. Garber, Cranford, N. J., assignors to Standard Oil Development Company, a corporation of Delaware No Drawing. Application February 15, 1949, Serial No. 76,666

10 Claims. (Cl. 260—78.4)

This invention relates to high molecular weight oxygenated compounds, relates particularly to high molecular weight poly-acids, poly-aldehydes, poly-alcohols and the like, and relates especially to olefinic polymers having oxygenated radicals therein, including acid, acid anhydride, aldehyde and alcohol radicals in substantial numbers in the molecular structure.

It has been found possible to produce a polymeric hydrocarbon resin from multi-olefinic compounds and mono-olefins which is a resin-like solid of good molecular weight which contains a considerable amount of residual unsaturation. This polymer is physically a light colored, hard, brittle non-elastomeric polymer which can be produced in any desired molecular weight range from about 500 to 10,000 or above, with melting points of the type characteristic of the resins as distinguished from the elastomers.

In the manufacture of this resin, the amount of residual ethylenic unsaturation (that is, carbon to carbon double linkage) is readily controllable, and by proper choice of reaction conditions, the number of double linkages per molecule can be adjusted from a few per molecule, that is, a half dozen to a dozen, up to a number sufficiently great to provide one unit of unsaturation for each 8, 7, or even 6 carbon atoms in the molecule. This control is, in part, obtained by the method of manufacture, and in part, obtained by an after treatment to reduce the number of double linkages present if it is unduly high in the resin as produced.

According to the present invention, it is found to be possible to combine into the polymer molecule, by virtue of the unsaturation present therein, a considerable number of unsaturated acid anhydride molecules, making use of the unsaturation in the anhydride for a reaction with the polymer molecule. For this reaction, maleic anhydride, as the first member of a series, is the preferred reactant, but any of the unsaturated acid anhydrides may be used without regard to the substituent present; such substances as citraconic anhydride, itaconic anhydride, ethyl maleic anhydride, dimethyl maleic anhydride, methyl-ethyl maleic anhydride, the chlorine and other halogen-substituted, unsaturated, acid anhydrides, and the like may also be used.

When the desired number of anhydride molecules have been combined into the polymer, the anhydride grouping may be hydrolyzed to yield a high molecular weight organic acid containing any desired number of acidic groupings. These acid groupings or their esters are then susceptible to reduction, such as by hydrogen to convert them to alcohols to produce high molecular weight poly-alcohols, which by gentle oxidation are readily oxidized to the stage of aldehydes, and accordingly, a high molecular weight organic aldehyde having any desired number of C=O groupings, may be produced in a molecule of any desired size. (It may be noted that it is prohibitively difficult and sometimes entirely impossible to reduce directly to the aldehydes, since the reaction usually necessarily proceeds to the alcohols.)

By this procedure, the properties of the polymer are profoundly modified. Its solubility in oil can be markedly reduced by the presence of oxygen atoms, either as the acid, or the aldehyde, or the alcohol. Similarly, a wide range of metal salts and esters can be produced from the acid compound. Likewise, the poly-alcohol can be converted into esters of a wide range of organic and inorganic acids. These properties permit of the tailoring of the molecule for almost any desired purpose.

Somewhat similar products are obtainable by oxidation of the polymer with oxidizing agents such as potassium permanganate or free oxygen in the presence of a cobalt catalyst or hydrogen peroxide and the like. Such oxidation products may take the form of either acid radicals, alcohol radicals, or aldehyde radicals and these in turn are susceptible to inter-conversion as desired to obtain acids, alcohols and aldehydes at will.

Similarly, the introduction of chlorine, either by direct reaction with free chlorine, or by the introduction of chlorine-containing carbon compounds yields materials which can be used as such or may be hydrolyzed by water or caustic to produce alcohols which in turn can be oxidized to aldehydes or acids and similar compounds produced.

Thus, the invention introduces into a high molecular weight, high unsaturation polymer, significant and modifying amounts of other non-metallic acid forming elements, such as bromine, iodine, sulfur and the like, which produce profound modifications in the physical and chemical properties of the polymer and which are subject to further reactions such as hydrolysis, oxidation, reduction and the like, followed by neutralization or esterification for still further modifying the physical and chemical properties of the polymer.

The primary raw material of the present invention is a high molecular weight, resinous, non-elastomeric copolymer obtained by the low temperature copolymerization of multi-olefins and mono-olefins. One of the preferred polymers is prepared from butadiene, copolymerized with the mono-olefin; however, any multi-olefin having from 4 to 14 carbon atoms per molecule and more than a single unit of unsaturation in the molecule is usable. Representative substances from this group are found in the butadiene above mentioned and in isoprene, piperylene, dimethyl butadiene, dimethallyl, myrcene, allo-ocymene, 2-methyl, 3-nonyl, butadiene-1,3, and the like.

The other component of the copolymer is a mono-olefin of which the preferred substance is the octene known as "dimer," obtained by the dimerization of isobutylene. This material is preferred because of its well balanced reactivity. Alternatively, any of the normal olefins having from 3 to 20 carbon atoms per molecule inclusive, and any of the iso-olefins having from 5 to 20 carbon atoms per molecule are more or less useful, depending mainly upon their commercial availability. Isobutylene is excluded, since when it is present, its very high reactivity causes the production of another type of polymer, which is an elastomer rather than a resin, and unduly limits the amount of multi-olefin which can be copolymerized.

The commercially preferred form of this resin is produced from butadiene and the octene known as "dimer," prepared by dimerization of isobutylene. The preferred range of proportions for polymerization lies within the ratio of a major proportion of the multiolefin, specifically butadiene, and a lesser or minor proportion of mono-olefin, specifically "dimer" or diisobutylene. It may be noted that the polymerization catalyst and temperature range is about the same for any of these proportions, and the various obtainable resins show only minor differences in melting point, and surprisingly small differences in iodine number, although the higher proportion of butadiene yields higher iodine number resins. The commercially important resin is prepared from about 60 parts of butadiene with 40 parts of "dimer."

In preparing the resin, the mixture of multi-olefin and mono-olefin is cooled to a temperature preferably between +10° C. and −40° C., although in some instances, temperatures as low as −103° C., or even −164° C., may be used. The cooling may be obtained by the use of a refrigerating jacket containing any suitable low boiling liquid which will yield the desired temperature, or an internal refrigerant may be used either as such, or with a reflux condenser and a more powerful refrigerating system on the reflux condenser. In the refrigerating jacket such substances as liquid propane, liquid ammonia, liquid sulfur dioxide, liquid or solid carbon dioxide, liquid ethane, liquid ethylene, occasionally even liquid methane, or liquid propane, liquid ethyl or methyl chloride, or one or more of the fluorinated hydrocarbons may be used, the choice being determined by the temperature desired and the equipment available. If an internal refrigerant is used, it is essential that the material be free from interference with the polymerization reaction. A particularly desirable refrigerant is liquid propane, although liquid butane, liquid methyl or ethyl chloride or various of the other halogenated hydrocarbons, including especially the fluorinated compounds, may be used, or liquid ethane, or liquid ethylene, or liquid or solid carbon dioxide or sometimes even liquid methane may be used. In a convenient system, the polymerization reactor is equipped with a reflux condenser which may be cooled by any of the substances listed as suitable refrigerants for a refrigerating jacket, and a low boiling diluent is then used in the reaction mixture, the temperature being determined by the proportion of volatile diluent used and the amount of refrigeration being automatically adjusted by the amount of cold reflux returned, as shown by our copending application, Serial No. 604,350, filed July 11, 1945 which issued January 22, 1952 as U. S. Patent 2,583,420, the subject matter of which is herewith incorporated into the present application.

It is usually desirable that there be present a diluent, in addition, having a higher boiling point than the refrigerant. For this purpose, such substances as liquid propane, liquid butane, liquid ethyl or methyl chloride, chloroform, methylene chloride, ethyl chloride, ethylene dichloride, carbon disulfide, light naphtha, and a wide range of other substances which are liquid at the reaction temperature and non-reactive with the catalyst and the olefins in the mixture are particularly useful.

The polymerization is preferably conducted by the application to the cold olefinic material of a Friedel-Crafts catalyst which preferably is in solution in a low-freezing, non-complex-forming solvent. For the catalyst, the preferred substances are aluminum chloride or boron trifluoride, or titanium tetrachloride, but any of the Friedel-Crafts active metal halide catalyst disclosed by N. O. Calloway in his article on "The Friedel-Crafts Synthesis" printed in the issue of "Chemical Reviews," published for the American Chemical Society at Baltimore, in 1935, in volume XVII, No. 3, the article beginning on page 327, the list being particularly well shown on page 375, may be used. Boron trifluoride may, if desired, be used in gaseous form and titanium tetrachloride may, if desired be used in the liquid form, but all of the catalysts are superior when used in solution.

For the solvent to be low-freezing, it is only necessary that it have a freezing point below 0° C., and to be non-complex-forming, that the instillation of solvent from the vapor phase shall produce a uniform change in boiling point and the distillation of solvent likewise shall produce a uniform change in boiling point, and that there does not separate from the solution, upon evaporation of the solvent, a compound between the solvent and the Friedel-Crafts active metal halide, and that in general, the metal halide can be recovered unchanged from the solvent.

The catalyst may be applied in any convenient way, although it is usually preferable that it be delivered into the body of the solution. A convenient method is by the delivery of the catalyst in the form of a fine, high pressure stream or jet into the body of the rapidly stirred cold olefinic material. Alternatively, boron trifluoride may be merely bubbled through the solution. It is usually desirable, however, to avoid the presence of catalysts above the surface of the cold liquid, since there may be gaseous olefins present, and if butadiene is used it is always present, and in a presence of catalysts there tends to produce a simple polymer of butadiene which is insoluble and infusible, and useless. This is a waste of material and it is difficult to separate from the desirable polymer.

The reaction proceeds more or less promptly, depending upon the choice of catalyst and the olefins involved. It may proceed so rapidly as to be substantially instantaneous, or it may be delayed for a substantial number of minutes. However, an excellent polymer is produced in due time, the heat of polymerization being absorbed by the refrigerant.

The resulting polymer may have a molecular weight ranging from 500 or 1,000 or a little higher up to 10,000, or occasionally as high as 20,000. The molecular weight is readily controlled by such items in the process as the temperature, the purity of the reactants, the presence or absence of catalyst poisons, and particularly the yield. If the reaction is allowed to start upon addition of catalyst, and then within a brief time such as a few seconds, it is quenched so that the yield is from 10 to 25% on the total unsaturates present, a molecular weight as low as 300 to 500 is readily obtainable, especially if the temperature of reaction is near the top of the previously indicated range. Alternatively, if very pure reactants and a very low temperature are used with a potent catalyst, and the reaction is allowed to go to completion, very high molecular weights are obtained with intermediate weights obtainable by intermediate procedures. The polymer may have an iodine number (by the Wijs method) ranging from about 60 up to about 250, depending upon the proportions of mono-olefin to multi-olefin and the method of preparation. Physically, the polymer is a light colored or water white, hard resin having a conchoidal fracture, of good strength, with a melting point usually within the range between about 75° C. to about 125° C.

The modifying non-metallic acid-forming element may then be introduced by any one of a variety of different methods, to produce the desired modification in the physical and chemical properties of the polymer.

A preferred procedure for the introduction of a modifying compound is by reaction between the polymer and an unsaturated acid anhydride, such as maleic anhydride or a substituted maleic anhydride such as citraconic anhydride, itaconic anhydride, ethyl maleic anhydride, dimethyl maleic anhydride, methyl-ethyl maleic anhydride, the chlorine and other halogen-substituted, unsaturated, acid anhydrides, or any alkyl-substituted maleic anhydride.

In this reaction, the unsaturated acid anhydride combines with the polymer to produce a material which contains one or more coupled succinic anhydride groupings. The exact details of this reaction are not very clear, but it is believed at the present time that a hydrogen is detached from a carbon in the polymer chain and re-combined with one end of one of the bonds in the double linkage in the anhydride molecule; with the other half of the double linkage attaching to the point from which the hydrocarbon was removed. It does not affirmatively appear that the unsaturation in the polymer molecule participates in the reaction but it does appear that the presence of unsaturation on an adjacent carbon to carbon linkage is essential to permit the reaction to go, since the reaction does not go with saturated compounds. Accordingly, it is possible to combine a maleic anhydride molecule to the polymer chain for each unit of unsaturation present in the chain. The reaction product appears at the present time to be:

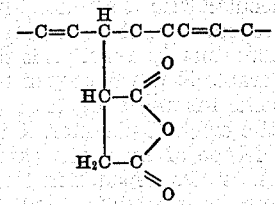

The number of anhydride groups added to the polymer is readily controlled merely by adjustment of the amount of anhydride added to the polymer up to the amount permitted by the amount of unsaturation present in the polymer molecule, and the reaction proceeds smoothly and easily at temperatures ranging from 140° to 180° C., and, since the molecular weight of the polymer is readily controlled, a material can be obtained having any desired molecular weight and any desired number of anhydride groupings.

Maleic anhydride is most easily incorporated into the polymer and the reaction proceeds readily merely by relatively moderate heating. It is also found that the reaction can be considerably speeded by the presence of peroxide catalyst such as benzoyl peroxide, potassium persulphate and the like. As a general rule, the substituted anhydrides are less readily reactive and while many of them will react merely upon heating, the reaction may be slow enough so that prolonged heating yields an undesirable molecular weight break-down. These anhydrides, therefore, are desirably incorporated into the polymer by the aid of an appropriate catalyst, which, as above indicated, may be a convenient peroxide, or other catalyst.

The anhydride groups may then be hydrolyzed to convert each anhydride grouping into a di-acid group. This di-acid group may then be neutralized by any of the metal oxides or alkalis to produce metal salts of the high molecular weight organic multi-acid. By the introduction of relatively large numbers of anhydride molecules, compounds are readily produced containing very large amounts of combined metal, for which there are many uses, not the least of which are thickeners and extreme pressure agents in lubricating oils. Alternatively, the di-acid groups may be esterified with any of the convenient alcohols to produce very high molecular weight esters which also are excellent lubricant thickeners, detergents and the like.

The presence of oxygen, either in the anhydride form or acid form, profoundly modifies the solubility of the polymer and may be caused to make it substantially insoluble in hydrocarbons. In some instances the solubility may be sufficiently changed to make the compound soluble in spirit such as the lighter alcohols and various of the other oxygenated solvents. As a rule, the anhydrides do not become water-soluble upon hydrolysis, but some, depending upon the amount of introduced anhydride and the completeness of hydrolysis show significant solubilities in water, and the metal salts; especially the alkali metal salts may be quite highly soluble in water, in which instance they are particularly useful for treatment of paper, textiles, leather goods, sizing, and the like.

The addition compound of polymer and anhydride is not, of course, limited to use in the anhydride or acid condition; it is quite readily reducible to the alcohol to produce polyhydroxy containing linear chain polymer. For this purpose, the material is preferably esterified by a moderate molecular weight alcohol, and then reduced by hydrogen. For this purpose, hydrogen alone is sufficient, but the reaction is so very slow that it is preferable to use hydrogen under pressure, and in some instances, depending upon the character of the original polymer, it is desirable to use a nickel type of hydrogen catalyst. The choice of methods also depends in large part on whether the unsaturation in the polymer is to be saturated with hydrogen. Hydrogen under pressure will usually saturate the unsaturation present first, then reduce the acid to alcohol, thereby producing an aliphatic poly-alcohol.

However, by proper choice of catalyst, temperature and pressure, particularly with copper chromite or tungsten sulfide as catalyst, it is in some instances possible to reduce the acid to alcohol first, leaving the unsaturation unaffected. This procedure is, however, difficult and not always possible, depending to some extent upon the amount of unsaturation present, the number of anhydride molecules coupled to the chain, and the extent of protective effect exerted by the presence of coupled anhydride molecules on the adjacent unsaturation.

Each polymer presents its own problem and that problem varies according to the presence or absence of esterifying alcohol as well as the molecular weight and many other factors.

The resulting poly-alcohol, whether saturated or unsaturated, has many very valuable properties, since it yields a relatively high molecular weight compound with a substantial water solubility which is extremely valuable for a great many purposes. In spite of the relatively large number of hydroxy groupings, it does not partake of the nature of a sugar, but has unique characteristics of its own. The hydroxy groups can be esterified in part, or wholly, by appropriate acids which may be either organic or inorganic as desired. Esterification by such compounds as the acids of phosphorous, yield materials which may be quite high in phosphorous, yet remain hydrocarbon soluble. Such compounds also are very valuable for addition to lubricating oils to improve the extreme pressure properties and mixtures of the poly-alcohol esterified with phosphorous acid; the poly-acid combined with salts such as copper or lead can be made to yield lubricants of good fluidity and very high extreme pressure properties, because of the presence of relatively large amounts of both lead and phosphorous.

Alternatively, of course, many other metals and compounds may be combined with both the poly-acid polymer and the poly-alcohol polymer, as will be obvious to those skilled in the art, since the acid and alcohol radicals behave normally, as they do in the ordinary low molecular weight compounds.

In the reduction of the acid, it is extremely difficult and usually impossible to arrest the reduction at the aldehyde stage, although it is highly probable that in the course of reduction, all of the acid groups go through the aldehyde stage. However, it is not prohibitively difficult to oxidize the alcohol back to the aldehyde. For this purpose, gentle oxidation methods are required, varying with each polymer and with the nature of added substituents, and each compound must be tested first to ascertain how strong oxidation is permissible without going clear to the acid stage. Again, standard methods of oxidation may be used, and the particular one chosen must be determined by test.

The alcohols produced by oxidation or reduction may be esterified for the production of a very valuable series of high molecular weight esters, in which the alcohol groups to be esterified may all be attached to one large molecule, and esterified by relatively low molecular weight compounds, such as formic acid, acetic acid, propionic acid, butyric acid and the like, or the higher molecular weight acids, such as stearic acid, oleic acid, linoleic acid and the like may be used. Alternatively, of course, a further portion of the same polymer with combined maleic anhydride, which has been hydrolyzed to acid may be used to esterify the high molecular weight alcohol.

By this procedure, a wide range of high molecular weight acids, aldehydes, esters, alcohols and salts may be produced, having a wide range of utility for many purposes. Some of the compounds are oil-soluble, some are both oil-insoluble and water-insoluble, some of the salts and esters are water-soluble and may be oil-soluble or oil-insoluble. They are useful for many things such as softeners, plasticizers, paint components, and a wide range of similar uses.

Alternatively, by esterification of the acid with glycerol or linseed oil or both, and addition of the ester to the coating materials, improved paints and varnishes may be obtained, and if there remains in the high molecular weight polymer a substantial amount of residual unsaturation, the compounds remain "air-drying" in varnishes, either upon baking or by the addition of "dryers," such as cobalt, and nickel naphthenates. Various of these compounds are compatible with many of the molding resins. The acid may be esterified with glycerol and when so treated, there is produced a very valuable alkyd type resin.

Oxygenated products may be obtained also by oxidizing the resin with such oxidizing agents as acid potassium permanganate, or chromic acid, or hydrogen peroxide or sodium peroxide or sodium persulphate, or the like.

This reaction tends to produce mixtures of high molecular weight oxygenated organic compounds which, if oxygen is used, may include aldehydes in which the oxygen is doubly linked to a carbon.

These compounds, likewise, may have more or less oxygen added, depending upon the vigor of the oxidizing reaction. However, the amount of oxygen added is in some instances limited by the tendency of the oxidation reaction to break down the polymer into lower molecular weight fragments, and it is not always possible to control the reaction to give exactly the desired compounds. However, it is usually possible to find a solvent for the oxidized polymer from which the more highly oxidized polymers can be fractionally precipitated by the addition of hydrocarbons. These oxidation products, likewise, can be hydrogenated to alcohols.

It may be noted that where ultra high molecular weight compounds are to be made, the anhydride reaction is preferable, since the molecular weight is usually raised by the reaction. Alternatively, where nominally high molecular weights are desired, and good yields from the polymerizer are also desired, the straight oxidation procedure is preferable, since it not only adds no more carbon atoms to the compound, but tends strongly to break down the molecular weight.

These two procedures will yield acids, aldehydes or alcohols, having from 40 to 1,000 carbon atoms per molecule, with almost any desired number of acid, or alcohol groups in the molecule.

In some instances, oxidation by the drastic agents is unduly severe. When this is found to be the case, excellent products are obtainable by the use of free oxygen in the presence of a cobalt catalyst such as cobalt naphthenate. In this instance also, the oxidation products will readily oxidize further to acids or may be reduced to alcohols.

Alternatively, the oxygen may be introduced via a chlorination route. For this purpose the polymer may be dissolved in an appropriate solvent such as carbon tetrachloride and elemental chlorine bubbled through the solution. The chlorination proceeds smoothly, rapidly and easily and can be conducted to any desired stage. The chlorine shows a definite tendency toward breakdown of the molecular weight, and accordingly, when the original resin has an undesirably high molecular weight, the chlorination process is particularly advantageous. It may be noted that the chlorine will saturate the double linkages directly, one molecule of chlorine combining with one of the linkages in a double bond to combine into the compound two chlorine atoms at each double linkage, and also, the chlorine removes hydrogen as hydrogen chloride and the second chlorine attaches to the carbon bond from which the hydrogen is removed. It is possible to obtain almost complete replacement of hydrogen and unsaturation by chlorine and the compound may then consist of nearly 80% by weight of chlorine.

There are many uses for these chlorine-containing polymers. They are particularly useful in slow-burning paints, since the high chlorine content markedly reduces the flammability.

Alternatively, however, these chlorinated resins are particularly useful for the introduction of oxygen into the polymer molecule. This is most easily accomplished by the use of caustic potash in alcohol or mixed alcohol and naphtha solution, or suspension, the finely dispersed resin in carbon tetrachloride solution, if convenient, being boiled with the caustic alkali. The chlorine is rapidly removed as such (or as HCl) by combination with the alkali metal to yield the chloride, and the hydroxyl is substituted for the chlorine in the polymer molecule to produce a high molecular weight alcohol. This alcohol likewise is readily oxidized to aldehyde and acid.

Still another method for introducing oxygen is by direct esterification of the unsaturated copolymer resin. For this reaction the resin may be treated directly with a relatively strong acid, or it may be dissolved in an inert solvent and then treated in solution with a strong acid. For this purpose, such acids as "glacial" acetic acid or sulfuric acid or syrupy phosphoric acid or the like may also be used. In this reaction it appears that the acidic hydrogen is removed from the acid and transferred to one end of a bond of a carbon to carbon double linkage, and the oxygen bond from which it is removed combines with the other end of the double linkage. This procedure destroys a unit of unsaturation in the polymer for every acid radical attached, and if the copolymer is saturated with acid, the iodine number is brought to zero, although, of course, by limitation of acid, a residual amount of unsaturation may be retained. Having formed the ester, it may be used as such, or it may be hydrolyzed to produce the free acid, and a multi-alcohol, as in the other forms of the invention. In this reaction, the number of hydroxyl radicals introduced is limited strictly by the number of residual units of unsaturation. In this instance also, the ester, having been formed and hydrolyzed to yield the poly-alcohol, the alcohol is readily oxidized to aldehyde or acid as desired.

Thus, by the procedures above outlined, it is possible to produce directly, high molecular weight acid, aldehyde and alcohol compounds which are particularly useful for a wide range of purposes.

It may be noted that the reactions above outlined can be used to increase or reduce the molecular weight of the polymer and to effect more or less profound changes in the molecular structure and configuration. It is particularly of interest to note that the unsaturated acid anhydride reaction markedly increases the melting point of the resin.

Thus, the process of the invention introduces into a high molecular weight olefinic copolymer, desired amounts of acid, aldehyde, or alcohol groupings to modify the physical and chemical properties of the polymer and improve them for a wide range of secondary products.

EXAMPLE 1

A resin was prepared, as above described, from a mixture of approximately 60 parts by weight of butadiene with 40 parts by weight of the octene known as "dimer," prepared by the dimerization of isobutylene. This polymer showed a Staudinger molecular weight of 900 and an iodine number of 145. The resin also showed a melting point of approximately 92° C. (by the ball and ring method) and was mixable with and soluble in any proportion of light naphtha, lubricating oil or linseed oil.

An amount of this polymer of 100 parts was then mixed with 30 parts of maleic anhydride and about 0.1% benzoyl peroxide and the mixture heated to 175° C. The molten mixture was very thoroughly stirred until a homogeneous composition was obtained. When the reaction was complete, after about 12 hours, the material was cooled to room temperature and the unreacted maleic anhydride extracted with hot water. It was then found that the melting point of the resulting resin had been raised to 105° C., and the iodine number reduced to about 115, with only minor increase in molecular weight.

This resin was mixed with a drying oil, wood flour, and pigment as a molding composition, and was found to be a good pressure molding composition which yielded a molded article of good strength and excellent durability.

EXAMPLE 2

Another portion of the same resin, treated as indicated, was dissolved in linseed oil to make a 15-gallon oil length varnish and given the usual varnish cook at 575° F. The cooked mixture was then thinned with Varsol and applied to test panels, some of which were dried by baking, others of which were allowed to air dry. Some of the air-dried panels were prepared with resin solution containing small amounts of cobalt and manganese naphthenates as dryers. These panels were then tested for resistance to oil, grease, water, steam, etc., and were found to be substantially superior to panels covered with varnish made from the untreated resin, showing that the quality of the resin as a varnish component was substantially improved.

EXAMPLE 3

A portion of the maleic treated resin described in Example 1 was dissolved in glycerol at 100° C. Heating was continued, the temperature being gradually raised to 250° C., until a decided bodying action had occurred. The mixture was thinned with xylene, 0.05% cobalt naphthenate and 0.50% lead naphthenate added, and stored. The solution was stable for several weeks, no appreciable change in viscosity occurring. Films were cast on glass panels and both air dried and baked. Resistance to fruit juices, soap, water and acids was excellent.

This compound is in many ways analogous to the so-called alkyd resins. It shows an excellent flexibility and toughness, characteristics which are highly desirable for the making of certain types of molded articles, especially electrical insulation, and uses where brittleness is objectionable.

EXAMPLE 4

A portion of the maleic treated butadiene-diisobutylene copolymer from Example 1 was heated at 200° C. with lauryl alcohol. Water distilled out showing that esterification occurred. The resulting esterified polymer was found to be soluble in mineral oil, whereas the original anhydrided polymer was insoluble, presumably due to the preponderance of succinic acid type side groups. This ester, being oil-soluble, is useful as an oil thickener and as an additive to greases and waxes.

EXAMPLE 5

A sample of butadiene-diisobutylene copolymer with a softening point of 80° C., an iodine number (Wijs) of 170 and a Staudinger molecular weight of 1200 was used in the following Examples 5, 6 and 8.

A 100 g. sample of the above resin was treated with 100 g. of acetic acid (glacial) and 25 g. of 30% $H_2O_2$. After the reaction mixture had stood for 24 hours at 40° C., it had become a homogeneous, clear liquid. The resulting product, after drying, was a white, low melting resin, iodine number of 0, which was a good plasticizer for nitrocellulose, phthalic resins, ureaformaldehyde resins and similar highly polar materials.

Films of nitrocellulose were cast from ketone solutions in one of which was dissolved (1) the original diene-olefin copolymer resin and (2) the acetylated-hydroxy resin as here produced. Severe blushing occurred in the former case while the latter was water-white, clear and very tough.

EXAMPLE 6

The acetylated-hydroxy resin described in Example 5 was further modified as follows: A 50 g. sample was treated with alcoholic KOH on the steam bath until saponification was judged complete. The resin structure was found to be such that a glycol unit occurred wherever there originally was a double bond.

The resulting tacky resin was heated with an equivalent amount of phthalic anhydride, dissolved in methyl ethyl ketone and films cast. After baking one hour at 125° C., a clear, hard, insoluble film was obtained. By substituting maleic anhydride for the phthalic anhydride, an air drying, varnish-like material was obtained. When completely cured, the films were unaffected by grease, boiling water and were even highly resistant to 5% alkali.

EXAMPLE 7

A plant run of butadiene-diisobutylene resin (100° C. softening point, 145 iodine number) was chemically oxidized as follows: A 20% solution of resin in $CCl_4$ was treated with an equivalent amount of 5% $KMnO_4$ solution in water. After 10 minutes of vigorous agitation, the reaction mixture was allowed to settle over night. The aqueous layer was discarded and the organic layer filtered to remove gel and manganese dioxide. It is to be noted that the filtration to remove gel was considerably faster after the permanganate treatment; before treatment the 20% $CCl_4$ solution was exceedingly difficult to filter. The resin was recovered by distilling off the $CCl_4$.

| Inspection | Original Resin | After $KMnO_4$ Treatment |
|---|---|---|
| Percent C | 86.99 | 85.06 |
| Percent H | 12.72 | 12.13 |
| Percent O (By Difference) | 0.29 | 2.81 |
| Iodine No. (Wijs) | 140.7 | 121.9 |
| Softening Pt. °C | 87 | 104 |
| Intrinsic Viscosity | 0.080 | 0.093 |

This resin was added to a sample of clear varnish and was found to yield a very substantial improvement in the oil resistance of the varnish. It may be noted that the oxygen content was increased many times, showing the presence of considerable additional oxygenated radicals.

EXAMPLE 8

A 25% solution of plant butadiene-diisobutylene resin as in Example 1, dissolved in xylene was heated to 80° C., and 1% of cobalt naphthenate, based on the resin, was added. Air was bubbled through under a reflux condenser for several hours. Upon isolation of the product, it was found that 4.5% oxygen had been absorbed. Other samples of these resins were neutralized with phosphoric acid after reduction to the alcohols, and still other samples were reacted with metal oxides, especially lead oxide after hydrolysis of the anhydrides, and the respective products were mixed with and dissolved in a wide range of oils and greases to produce lubricants of excellent properties. The dissolved high molecular weight polymer showed a very excellent thickening effect and improvement in the viscosity index, and the presence of the lead and phosphorus produced an outstanding gain in extreme pressure properties.

For the base oil, a wide range of lubricants were used, including both paraffinic base and naphthenic base, light oils, medium oils and heavy oils, and also standard grease formulae. In each instance, outstanding improvement was obtained in the properties of the lubricant.

The above examples show addition of oxygen by incorporation of maleic anhydride, by direct oxidation and by chlorination and hydrolysis. It should be noted that the maleic anhydride shown, is representative of the oxygen containing ring anhydrides generally, and it is found that any of these unsaturated ring anhydrides are useful, and to the present, no limitation has been found upon the size or number of substituents, whether aliphatic, olefinic or aromatic, and determinations to the present indicate that while some of the ring anhydrides react with less ease than does maleic anhydride, all of the unsaturated anhydrides will react if aided by appropriate catalyst, which in general are the peroxide catalysts as a group, and accordingly, the choice of anhydride can be made by one skilled in the art, according to the compound desired and the permissibility of the use of catalysts. It may be noted, however, that as the number of carbon atoms in the substituent increases, the number of molecules which can be added to the resin tends to decrease, perhaps because of interference between adjacent substituents. It should also be noted that the size of the alkyl substituent on the anhydride ring profoundly modifies the solubility of the resulting polymer compound, since the reduction in hydrocarbon solubility by an anhydride containing a large substituent is much less than that from maleic anhydride, or the lower anhydrides, and accordingly, by choice of the anhydride used, it is possible to obtain almost any desired character of modification of solubility.

EXAMPLE 9

A portion of the butadiene-diisobutylene resin described in Example 1, was dissolved in carbon tetrachloride to about a 15% concentration and elemental chlorine was bubbled through the solution until an amount of about 15% (the increase in weight of the solution) had been absorbed. At this point, the supply of chlorine was interrupted and the resin solution washed with water to remove surplus chlorine. The solution was then agitated vigorously with a sufficient amount of an aqueous solution of sodium hydroxide to combine with all of the chlorine present in the molecule and leave a liberal excess. The mixture was stirred vigorously for several hours and then allowed to stand over night to settle out all of the aqueous solution of caustic and chloride.

The aqueous solution of caustic and chloride was then separated from the resin solution, the resin solution washed with water to remove the last traces of caustic and salt, the wash-water separated, and the resin was then recovered by evaporation of the solvent. The resulting resin was found to have an iodine number of 20 and a molecular weight of approximately 4,000. The melting point (ball and ring method) of the original resin was approximately 80° C., and the chlorine added raised the melting point to approximately 140°, while reducing the iodine number to 20.

The resulting product containing hydroxyl groups is particularly useful for the making of esters as above outlined, and also as a thickener and viscosity index improver when in solution in lubricating oils and greases.

The chlorinated material was found to be an excellent plasticizer and extender for polyvinyl chloride, imparting excellent plasticity properties and flexibility with a minimum of loss of tensile strength.

In this instance, also, the polyalcohol was found to be readily oxidizable to the corresponding polyacid, and by proper control, this material as well as the other alcohols could be oxidized in part to acid, leaving part of the substituents present as hydroxyl groups, producing thereby a polyacid-polyalcohol having extremely interesting properties. Also, by the methods above outlined, the alcohol could be, without too much difficulty, oxidized to the aldehyde stage.

EXAMPLE 10

A series of polymerizations were conducted in which from 13½ to 14½ parts by volume of liquid butadiene were mixed with 5¾ to 9 parts by volume of the octene produced by dimerizing isobutylene, and with from 20 to 60 parts by volume of propane, as shown in Table 1. The resulting mixture yielded various temperatures, as shown in the table. The reaction was conducted in each instance, by the addition of from 10 to 18.6 parts by volume of catalyst solution containing 3% aluminum chloride in solution. In each instance, the catalyst solution contained from 1% to about 10% of hydrogen chloride. The several polymerizations required from 180 to 280 minutes for completion, at the end of which time approximately one part by volume of alcoholic caustic soda solution was added to inactivate the catalyst, the material was brought up to room temperature to volatilize out the diluent and unconverted reactants and the resulting polymer was then washed with five applications of water. The percent yield is shown in the table for each polymerization, and the proximate analysis for carbon, hydrogen and chlorine as well as the iodine number (by the Wijs method) are likewise shown in the table.

*Table 1*

| Pr. No. | Time of run, min. | Gal. Butadiene | Gal. Dimer | Gal. Propane | Poly. Temp., °F. | Gal. Catalyst | Percent Yield of Resin | Analysis of Resin | | | Iodine No. |
|---|---|---|---|---|---|---|---|---|---|---|---|
| | | | | | | | | Percent C | Percent H | Percent Cl | |
| 1 | 260 | 13.5 | 9.0 | 60 | −12 | 13 | 25 | 85.28 | 12.58 | 1.4 | 147 |
| 2 | 280 | 13.5 | 9.0 | 60 | +5 | 10 | 62 | 85.10 | 12.95 | 1.1 | 128 |
| 3 | 280 | 14.5 | 5.76 | 20 | −13 | 17 | 55 | 83.80 | 11.97 | 1.2 | 168 |

A series of polymerizations was conducted using a catalyst solution which was substantially free from hydrogen chloride as such, and contained only pure aluminum chloride aside from the methyl chloride solvent. The results obtained are shown in Table 2:

*Table 2*

| Pr. No. | Time of run, min. | Gal. Butadiene | Gal. Dimer | Gal. Propane | Poly. Temp., °F. | Gal. Catalyst | Percent Yield of Resin | Analysis of Resin | | | Iodine No. |
|---|---|---|---|---|---|---|---|---|---|---|---|
| | | | | | | | | Percent C | Percent H | Percent Cl | |
| 16 | 165 | 11.9 | 10.3 | 50 | 0 | 7.8 | 64 | 86.85 | 12.82 | 0.13 | 137 |
| 17 | 170 | 11.9 | 10.3 | 68 | 0 | 10.5 | 74 | 86.53 | 13.22 | 0.08 | 133 |
| 18 | 240 | 11.9 | 10.3 | 60 | 0 | 8.0 | 73 | 86.52 | 13.80 | 0.02 | 133 |

It may be noted that while a small amount of chlorine is present, it is much lower in amount, and the iodine number is not very greatly different.

EXAMPLE 11

A portion of resin, as in Example 1, was reacted with maleic anhydride in sufficient quantity to attach to the polymer molecule a good number of anhydride molecules. These were then hydrolyzed to the acid as outlined in Example 1. The material obtained was then divided into two portions and one portion was treated directly with lead carbonate to produce a lead salt of the poly-basic-acid. The other portion was then reduced with hydrogen in the presence of tungsten sulfide as hydrogenation catalyst to convert the acid groups into alcohol radical (without saturation of the residual double linkages remaining in the polymer molecule). The hydrogenated portion was then treated with water solution of fairly strong phosphoric acid, to convert it into the phosphate ester. Approximately equal portions of the two compounds were then incorporated into a light lubricating oil. They were found to be reasonably soluble and the viscosity of the oil solution was considerably raised, as was the viscosity index, and the material was found to have excellent extreme pressure properties.

This procedure is found to be an excellent means for incorporating into lubricating oil, relatively high quantities of lead and phosphorous to improve the extreme pressure properties.

EXAMPLE 12

A similar portion of the resin prepared as in Example 1 was coupled with maleic anhydride, hydrolyzed, reduced with hydrogen under pressure and treated with sulfur dioxide and heat to produce a sulfonate. This material also was found to be readily soluble in lubricating oil, in which solution it produced a conspicuous and valuable thickening action, a worthwhile improvement in the viscosity index and an excellent improvement in the extreme pressure properties of the oil.

Those of the above examples in which the oxygen is introduced by an anhydride, show mainly maleic anhydride. However, the other substituted unsaturated anhydrides react in so nearly the same way that there is no additional teaching of value in a showing of examples of such reactions, and accordingly, these examples are presented as representative teachings of all of the acid anhydrides having any number of carbon atoms in the oxygen-containing ring, and any number of carbon atoms or other substituents replacing hydrogen in the oxygen-containing ring. That is, the reaction is found to be a general one, applicable to the highly unsaturated linear polymer obtained by the reaction of a major proportion of a multiolefin having from 4 to 14, inclusive, carbon atoms per molecule with a mono-olefin having from 5 to 20, inclusive, carbon atoms per molecule, coupled with an unsaturated organic acid anhydride of any number of carbon atoms in ring or substituent.

It is of the essence of the invention, however, that there shall be present in the polymerizate mixture, a major proportion of the multiolefin, since otherwise the amount of maleic anhydride which can be coupled into the polymer molecule is too small to be significant with respect to these factors which modify the physical and chemical properties of the polymer, and it is of the essence of the invention that there shall be present in the polymer, at least 40 carbon atoms, since with smaller numbers of carbon atoms than this, the valuable properties are not obtained. That is, there is a critical point of change-over at about 40 carbon atoms per molecule, below which, thickening action, V. I. improvement and the like, are imperceptible. Likewise, there must be present in the polymer a very substantial amount of residual unsaturation from a major proportion of diolefin in the polymerizate mixture in order to permit of the incorporation of sufficient acid anhydride to yield the characteristic result of this invention. These requirements exclude from the list of components isobutylene, which, because of its high reactivity, does not yield a polymer having a sufficiently large amount of residual unsaturation, but does not exclude either normal butene or propylene as the mono-olefin. (Ethylene is of such low reactivity that it does not participate in this type of reaction).

While there are above disclosed but a limited number of embodiments of the process and product of this invention, it is possible to produce still other embodiments without departing from the inventive concept herein disclosed, and it is therefore desired that only such limitations be imposed upon the appended claims as are stated therein.

The invention claimed is:

1. A composition of matter comprising a solid, somewhat brittle, non-elastomeric resin composed of at least 50% of copolymerized butadiene with not more than 50% of copolymerized diisobutylene, and having an iodine number within the range between 60 and 250, a molecular weight within the range between 500 and 20,000, together with maleic anhydride combined with the residual double bonds of the copolymerized resin.

2. A composition of matter comprising a solid, somewhat brittle, non-elastomeric resin composed of at least 50% of copolymerized butadiene with not more than 50% of copolymerized diisobutylene, and having an iodine number within the range between 60 and 250, a molecular weight within the range between 500 and 20,000, together with maleic anhydride combined with the residual double bonds of the copolymerized resin, the anhydride hydrolyzed to the corresponding diacid, and the resulting diacid esterified with an alcohol.

3. A composition of matter comprising a solid, somewhat brittle, non-elastomeric resin composed of at least 50% of copolymerized butadiene with not more than 50% of copolymerized diisobutylene, and having an iodine number within the range between 60 and 250, a molecular weight within the range between 500 and 20,000, together with maleic anhydride combined with the residual double bonds of the copolymerized resin, the anhydride hydrolyzed to the corresponding diacid, and the diacid reduced to a polyalcohol.

4. A composition of matter comprising a solid, somewhat brittle, non-elastomeric resin composed of at least 50% of copolymerized butadiene with not more than 50% of copolymerized diisobutylene, and having an iodine number within the range between 60 and 250, a molecular weight within the range between 500 and 20,000, together with maleic anhydride combined with the residual double bonds of the copolymerized resin, the anhydride hydrolyzed to the corresponding diacid, the diacid reduced to a polyalcohol, and esterified with an acid.

5. A composition of matter comprising a solid, somewhat brittle, non-elastomeric resin composed of 60 parts of copolymerized butadiene, with 40 parts of copolymerized diisobutylene, and characterized by an iodine number within the range between 60 and 250, a molecular weight within the range between 500 and 20,000, and having 30 parts of maleic anhydride combined with the residual double bonds of the copolymerized resin.

6. A composition of matter comprising a solid, somewhat brittle, non-elastomeric resin composed of 60 parts of copolymerized butadiene, with 40 parts of copolymerized diisobutylene, and characterized by an iodine number within the range between 60 and 250, a molecular weight within the range between 500 and 20,000, having 30 parts of maleic anhydride combined with the residual double bonds of the copolymerized resin, and the anhydride hydrolyzed to the corresponding diacid.

7. A composition of matter comprising a solid, somewhat brittle, non-elastomeric resin composed of 60 parts of copolymerized butadiene, with 40 parts of copolymerized diisobutylene, and characterized by an iodine number within the range between 60 and 250, a molecular weight within the range between 500 and 20,000, and having 30 parts of maleic anhydride combined with the residual double bonds of the copolymerized resin, the anhydride hydrolyzed to the corresponding diacid, and reduced to a polyalcohol.

8. A composition of matter comprising a composition selected from the group consisting of an anhydride of a solid, somewhat brittle, non-elastomeric resin composed of at least 50% of copolymerized butadiene with not more than 50% of copolymerized diisobutylene and having an iodine number within the range between 60 and 250, a molecular weight within the range between 500 and 20,000, with maleic anhydride combined with the residual double bonds of the copolymerized resin, the corresponding diacid produced by hydrolyzing the said anhydride, the ester of the said diacid esterified with an alcohol, the polyalcohol of the said diacid produced by reducing said diacid, and the ester of said polyalcohol esterified with an acid.

9. A composition of matter comprising a composition selected from the group consisting of an anhydride of a solid, somewhat brittle, non-elastomeric resin composed of 60 parts of copolymerized butadiene, with 40 parts of copolymerized diisobutylene, and characterized by an iodine number within the range between 60 and 250, a molecular weight within the range between 500 and 20,000, with maleic anhydride combined with the residual double bonds of the copolymerized resin, the corresponding diacid produced by hydrolyzing the said anhydride, the ester of the said diacid esterified with an alcohol, the polyalcohol of the said diacid produced by reducing said diacid, and the ester of said polyalcohol esterified with an acid.

10. A composition of matter comprising a solid, somewhat brittle, non-elastomeric resin composed of 60 parts of copolymerized butadiene, with 40 parts of copolymerized diisobutylene, and characterized by an iodine number within the range between 60 and 250, a molecular weight within the range between 500 and 20,000, and having 30 parts of maleic anhydride combined with the residual double bonds of the copolymerized resin, the anhydride hydrolyzed to the corresponding diacid, the diacid reduced to a polyalcohol, and esterified with an acid.

WILLIAM J. SPARKS.
DAVID W. YOUNG.
JOHN D. GARBER.

REFERENCES CITED

The following references are of record in the file of this patent:

UNITED STATES PATENTS

| Number | Name | Date |
|---|---|---|
| 2,122,826 | Peski | July 5, 1938 |
| 2,142,980 | Huijser et al. | Jan. 3, 1939 |
| 2,476,000 | Sparks et al. | July 12, 1949 |